US010973299B2

(12) United States Patent
Villarreal et al.

(10) Patent No.: US 10,973,299 B2
(45) Date of Patent: Apr. 13, 2021

(54) DEPRESSIBLE THERMAL TIPS

(71) Applicant: HCT GROUP HOLDINGS LIMITED, Sheung Wan (CN)

(72) Inventors: Armando Villarreal, Los Angeles, CA (US); Timothy Thorpe, Santa Monica, CA (US)

(73) Assignee: HCT GROUP HOLDINGS LIMITED, Hong Kong (CN)

( * ) Notice: Subject to any disclaimer, the term of this patent is extended or adjusted under 35 U.S.C. 154(b) by 22 days.

(21) Appl. No.: 16/580,744

(22) Filed: Sep. 24, 2019

(65) Prior Publication Data
US 2020/0015569 A1 Jan. 16, 2020

Related U.S. Application Data

(63) Continuation of application No. 15/944,557, filed on Apr. 3, 2018, now Pat. No. 10,455,918, which is a (Continued)

(51) Int. Cl.
A47L 13/30 (2006.01)
A45D 34/04 (2006.01)
(Continued)

(52) U.S. Cl.
CPC .......... *A45D 34/041* (2013.01); *A45D 34/04* (2013.01); *B05B 11/0037* (2013.01);
(Continued)

(58) Field of Classification Search
CPC .... A45D 34/041; A45D 2200/045–056; B05B 11/00412; B05B 11/3025; B05B 11/3053; B05C 17/00569; B65D 47/42
(Continued)

(56) References Cited

U.S. PATENT DOCUMENTS 4,685,820 A 8/1987 Kremer et al.
4,783,185 A 11/1988 Erismann et al.
(Continued)

FOREIGN PATENT DOCUMENTS

EP 2430945 A2 3/2012
EP 2599558 B1 7/2018
(Continued)

OTHER PUBLICATIONS

International Search Report dated Feb. 24, 2015 in corresponding International Patent Application No. PCT/US2014/043877.
(Continued)

*Primary Examiner* — Jennifer C Chiang
(74) *Attorney, Agent, or Firm* — Seager, Tufte & Wickhem LLP

(57) ABSTRACT

A dispenser includes a depressible thermal tip and a housing having a reservoir for containing a product, such as a cosmetic product or a medicinal product. The depressible thermal tip comprises a thermal applicator displaceable between open and closed positions. The thermal applicator may be depressibly coupled in a collar fixed to the housing, or the thermal applicator may be depressibly coupled in a button depressibly coupled in a collar fixed to the housing.

20 Claims, 9 Drawing Sheets

Related U.S. Application Data continuation of application No. 15/382,038, filed on Dec. 16, 2016, now Pat. No. 9,949,549, which is a continuation of application No. 14/313,453, filed on Jun. 24, 2014, now Pat. No. 9,538,824.

(60) Provisional application No. 61/838,790, filed on Jun. 24, 2013.

(51) Int. Cl.
| | |
|---|---|
| *B05C 17/005* | (2006.01) |
| *F16K 31/58* | (2006.01) |
| *F16K 1/00* | (2006.01) |
| *B05B 11/00* | (2006.01) |
| *B65D 47/42* | (2006.01) |

(52) U.S. Cl.
CPC .... *B05B 11/00412* (2018.08); *B05B 11/3025* (2013.01); *B05B 11/3053* (2013.01); *B05C 17/00569* (2013.01); *B65D 47/42* (2013.01); *F16K 1/00* (2013.01); *F16K 31/58* (2013.01); *A45D 2200/054* (2013.01); *A45D 2200/055* (2013.01); *A45D 2200/056* (2013.01); *B05B 11/0038* (2018.08)

(58) Field of Classification Search
USPC .............................. 401/183, 188 R
See application file for complete search history.

(56) References Cited

U.S. PATENT DOCUMENTS

| | | | |
|---|---|---|---|
| 5,056,949 A | 10/1991 | Petrillo | |
| 6,309,128 B1 | 10/2001 | Griebel et al. | |
| 6,382,472 B1 | 5/2002 | Shoval | |
| 7,883,287 B2 | 2/2011 | Thorpe | |
| 8,262,592 B1 | 9/2012 | Brooks et al. | |
| 8,631,975 B2 | 1/2014 | Lim | |
| 8,757,914 B1 * | 6/2014 | Megaro | B05B 11/3052 |
| | | | 401/219 |
| 8,864,401 B2 | 10/2014 | Duru | |
| 9,033,606 B2 | 5/2015 | Turchi et al. | |
| 9,248,462 B2 | 2/2016 | Csaszar | |
| 9,277,798 B2 | 3/2016 | Moreau | |
| 9,364,849 B2 | 6/2016 | Uehara | |
| 9,538,824 B2 | 1/2017 | Villarreal et al. | |
| 9,848,684 B2 | 12/2017 | Kim et al. | |
| 9,867,443 B2 | 1/2018 | Kim et al. | |
| 9,949,549 B2 | 4/2018 | Villarreal et al. | |
| 10,595,610 B2 * | 3/2020 | Son | A45D 33/12 |
| 2010/0243677 A1 | 9/2010 | Lim | |
| 2011/0103878 A1 | 5/2011 | Neuner et al. | |
| 2017/0029178 A1 | 2/2017 | Kim | |
| 2018/0050360 A1 | 2/2018 | Son et al. | |
| 2019/0000215 A1 | 1/2019 | Son et al. | |

FOREIGN PATENT DOCUMENTS

| | | |
|---|---|---|
| FR | 57397 E | 1/1953 |
| FR | 2981639 A1 | 4/2013 |
| WO | 2013017801 A1 | 2/2013 |

OTHER PUBLICATIONS

Extended European Search Report dated Aug. 2, 2019 in European Divisional Application No. 19167953.9.
Communication Relating to the Results of the Partial International Search (Annex to Form PCT/ISA/206) dated Oct. 16, 2014 in corresponding International Patent Application PCT/US2014/043877.

* cited by examiner

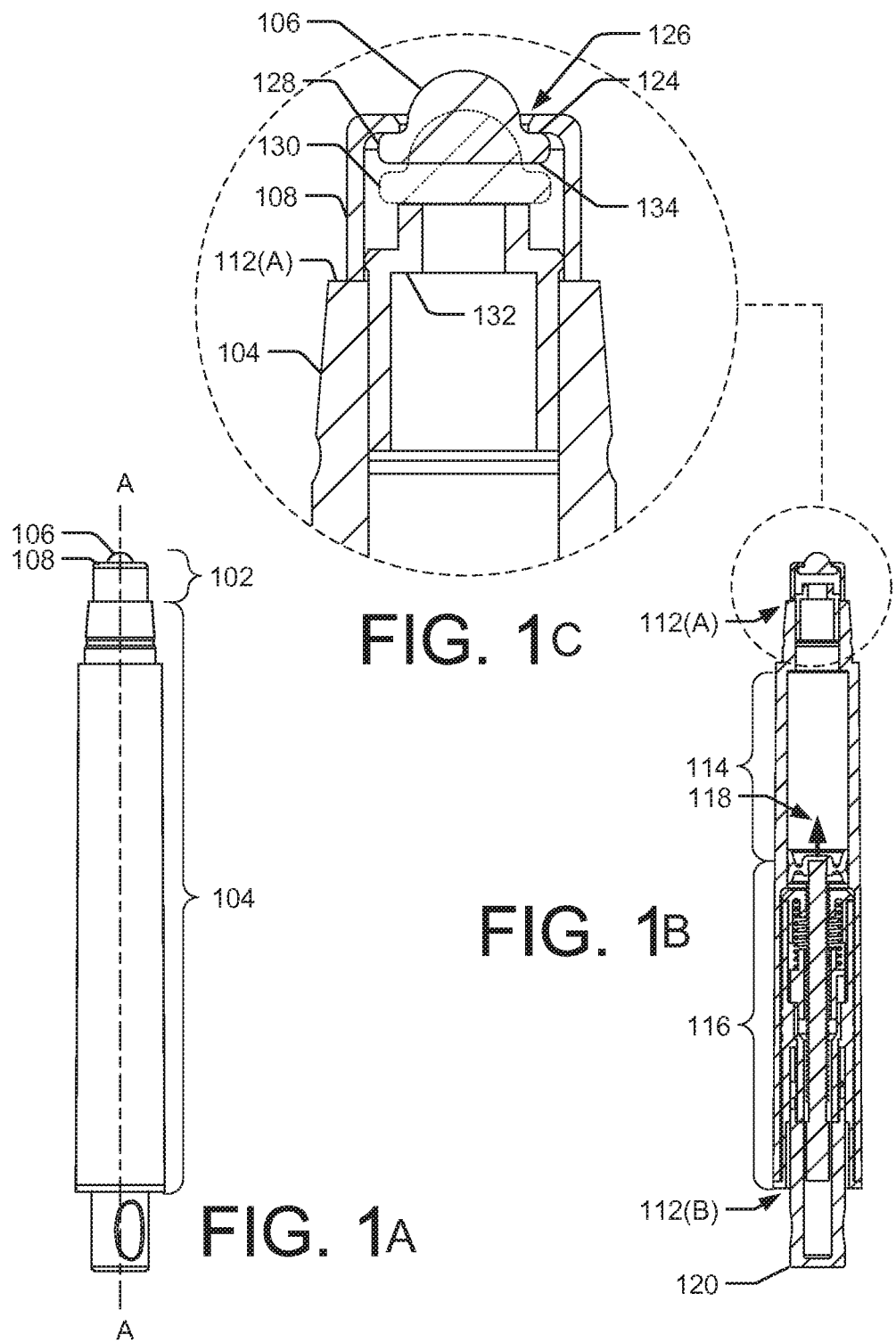

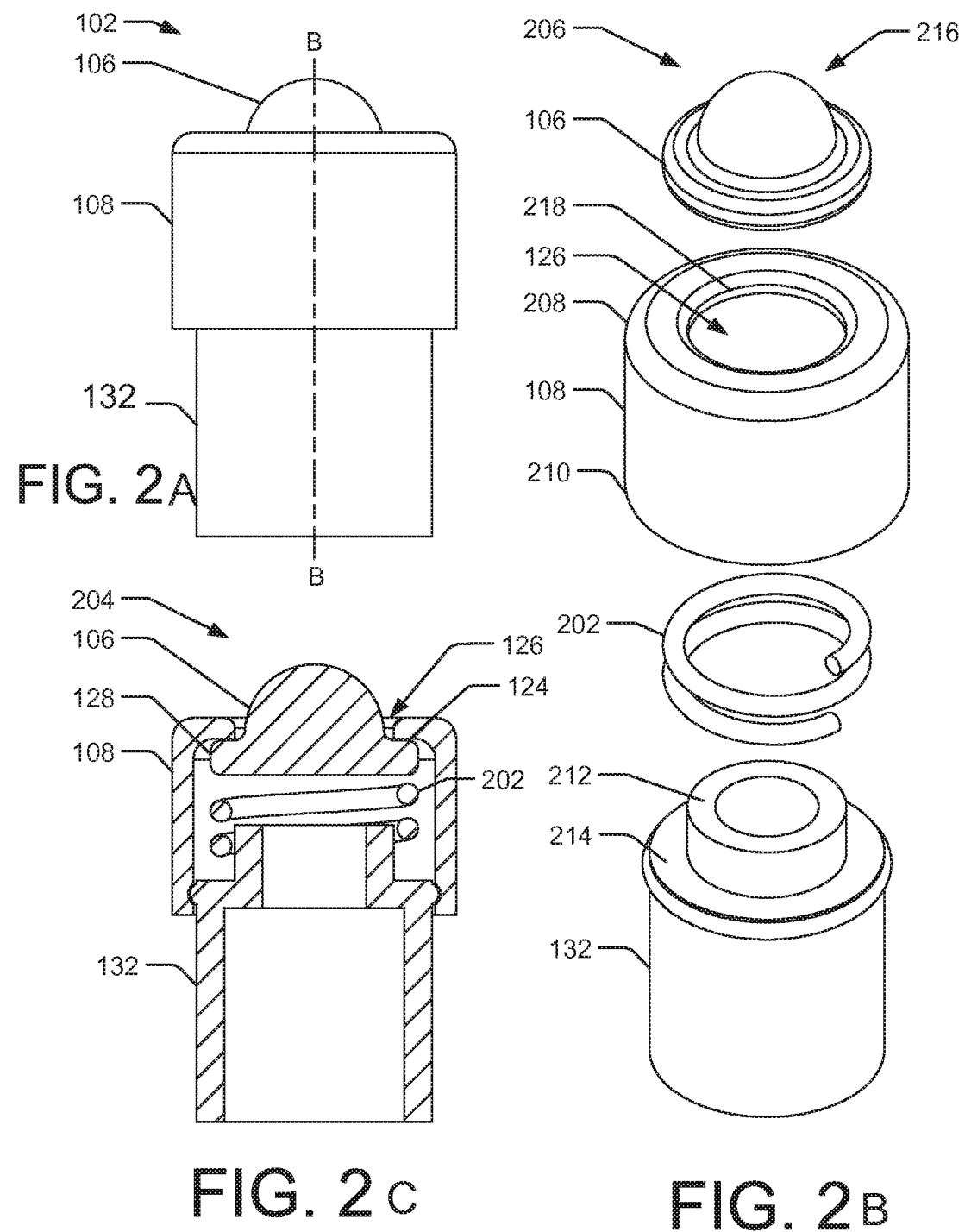

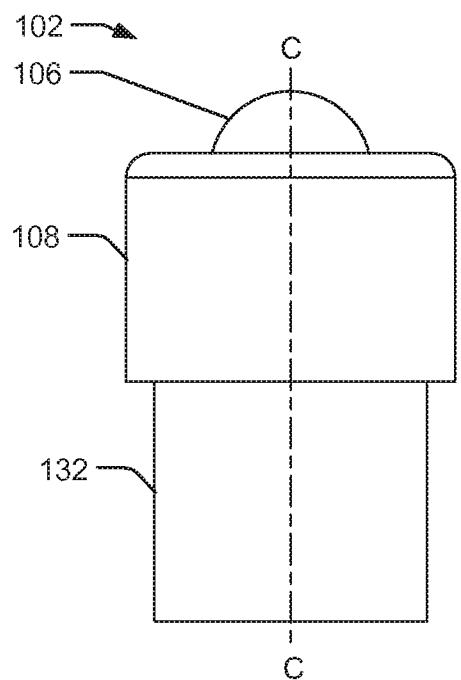
FIG. 3A
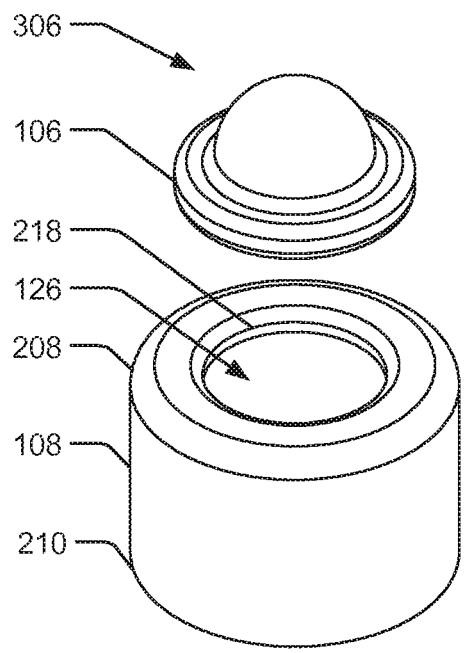
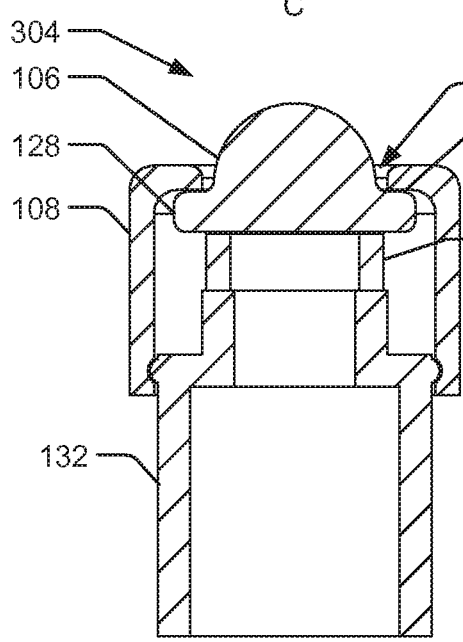
FIG. 3B
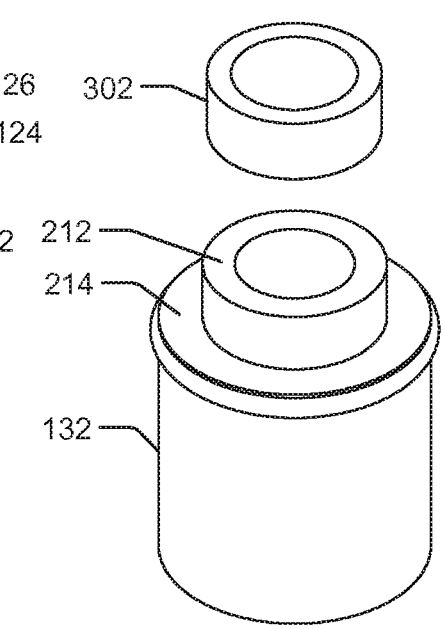
FIG. 3C

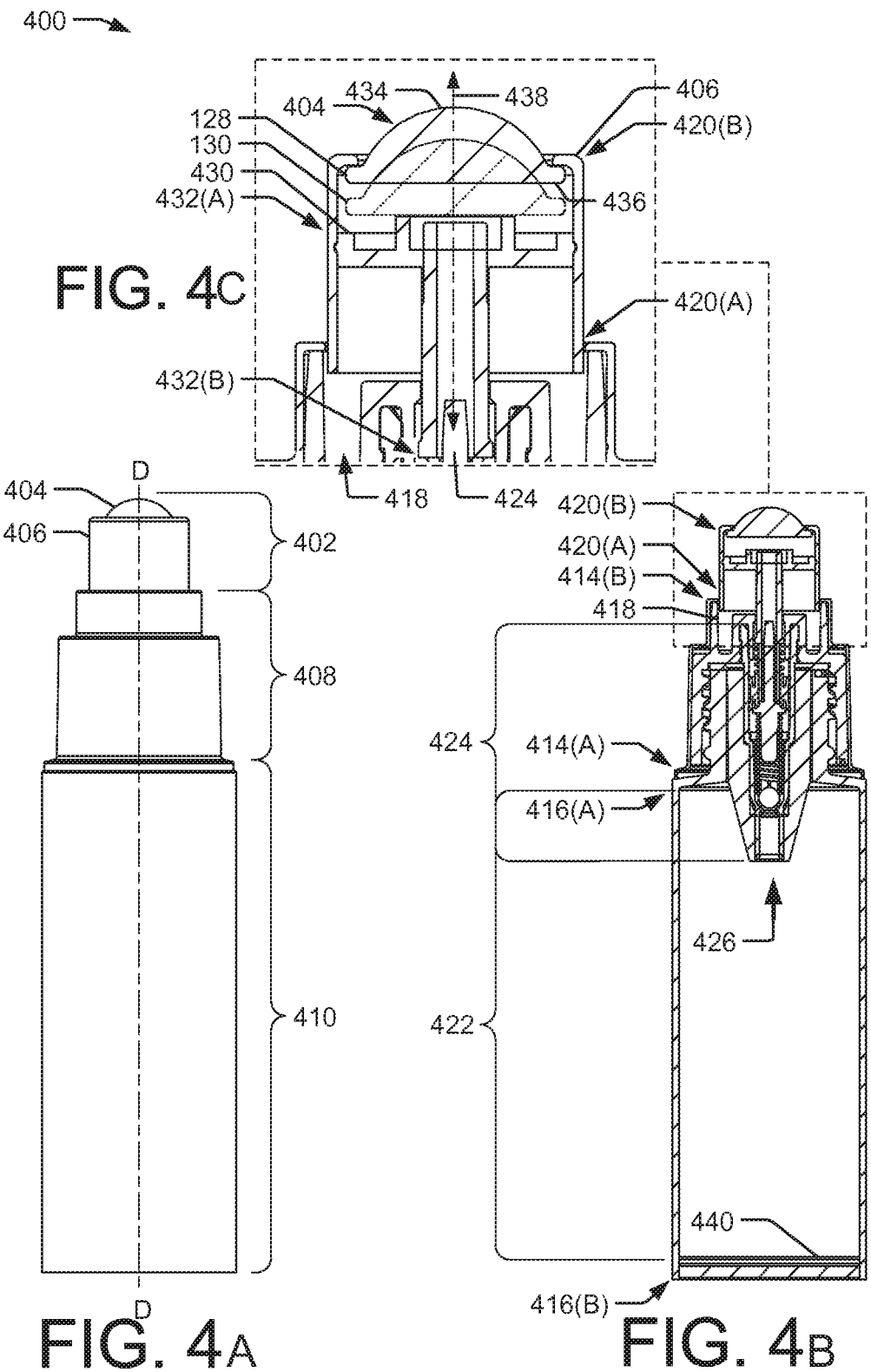

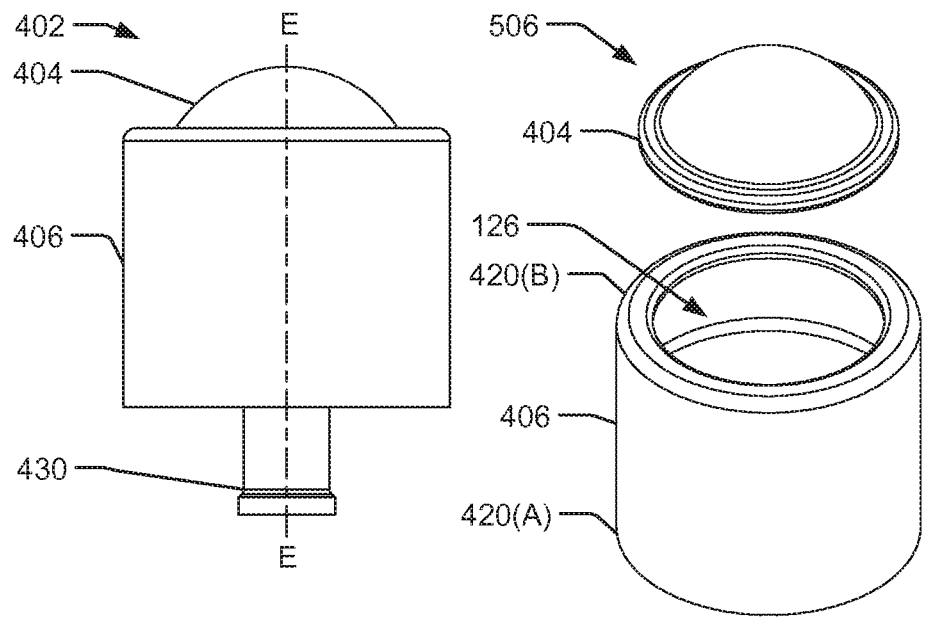
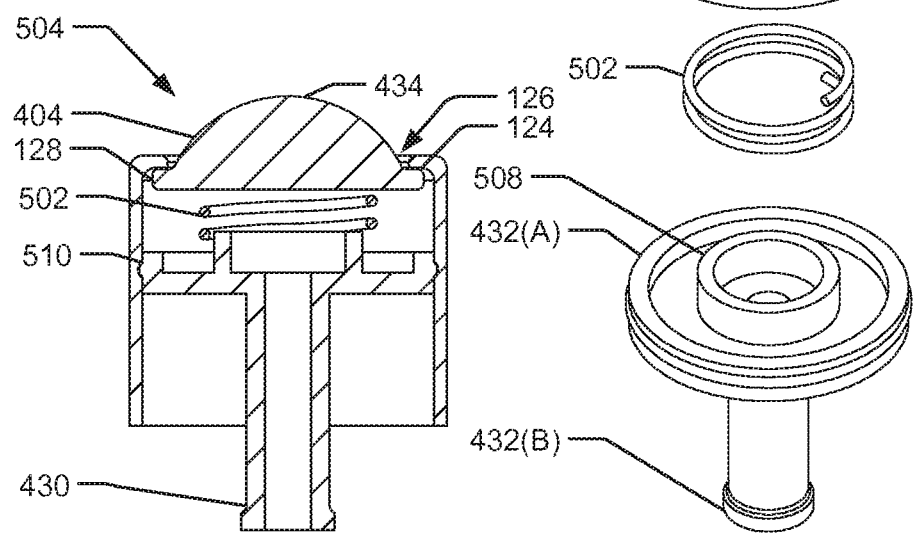
FIG. 5A
FIG. 5B
FIG. 5C

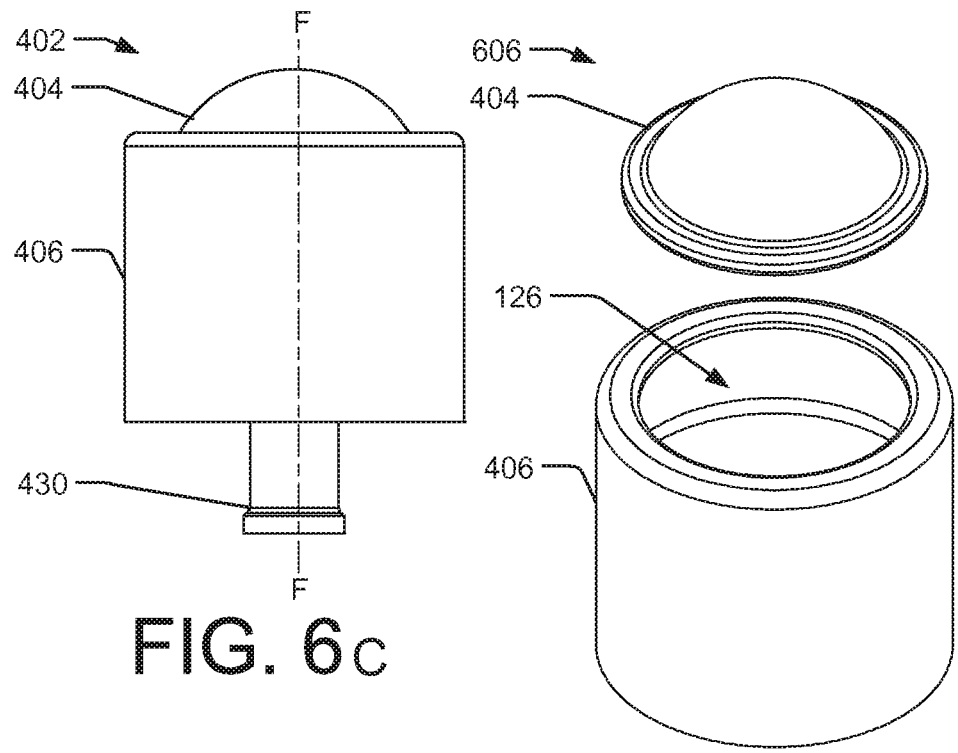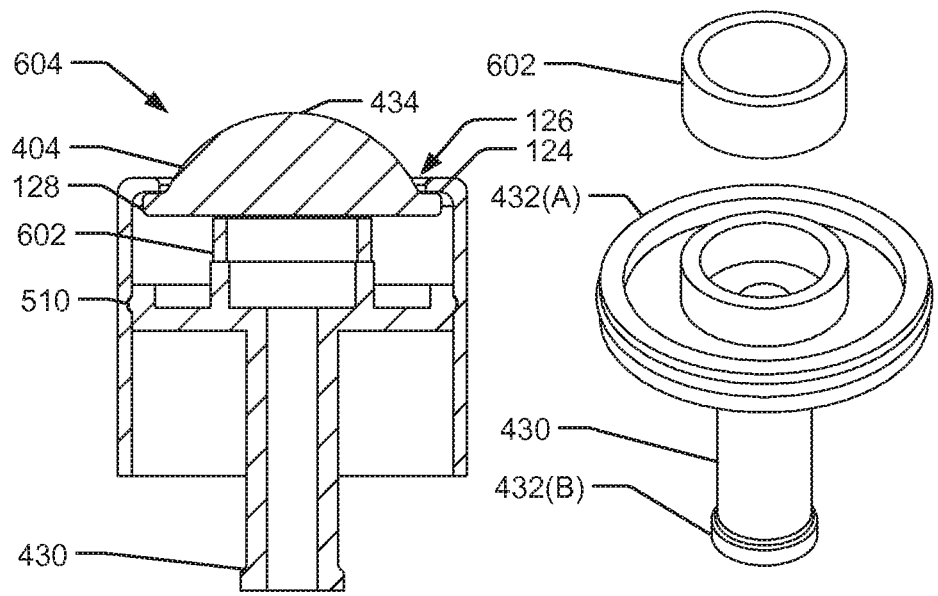

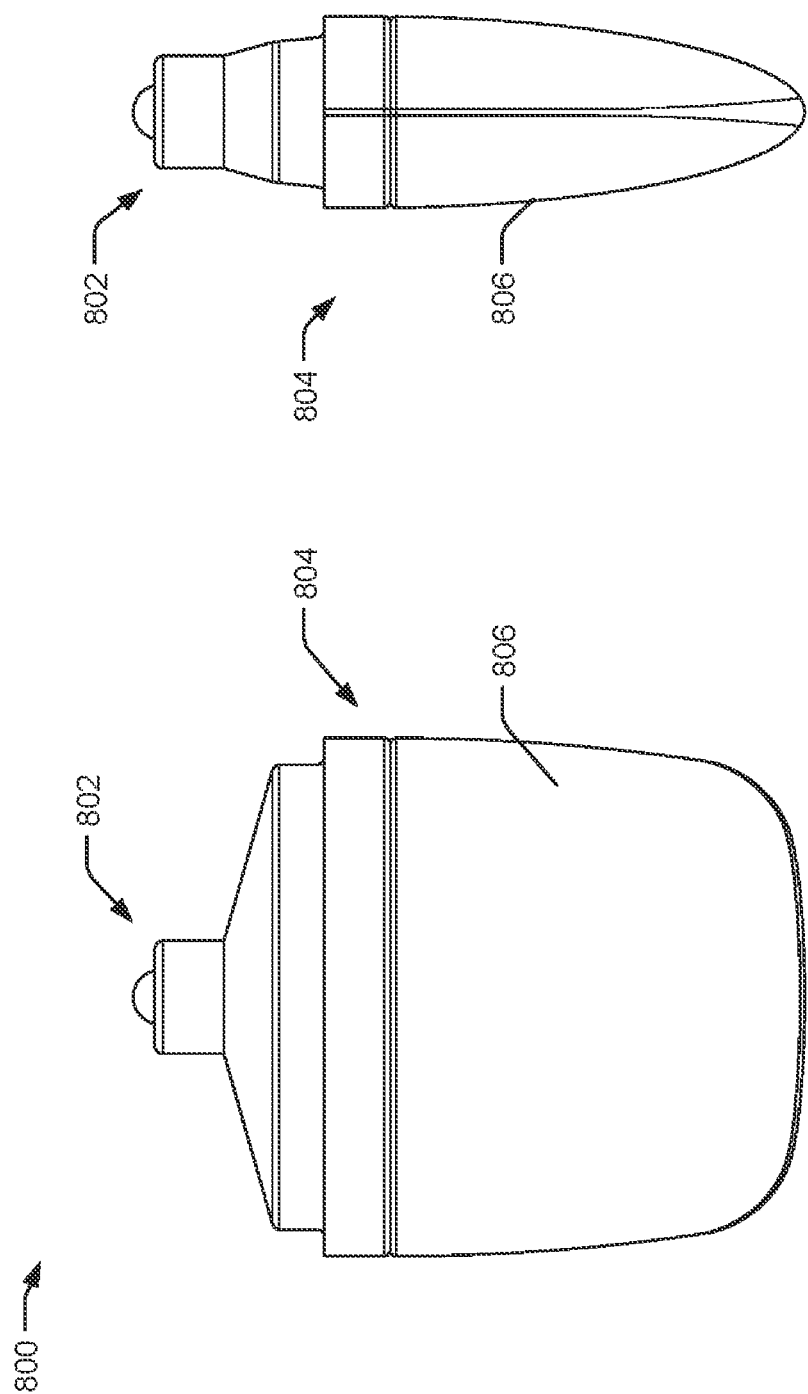

DEPRESSIBLE THERMAL TIPS

CROSS REFERENCE TO RELATED APPLICATIONS

The present application is a continuation of U.S. patent application Ser. No. 15/944,557, filed Apr. 3, 2018, which is a continuation of U.S. patent application Ser. No. 15/382,038, filed Dec. 16, 2016, now U.S. Pat. No. 9,949,549, which is a continuation of U.S. patent application Ser. No. 14/313,453, filed Jun. 24, 2014, now U.S. Pat. No. 9,538,824, which claims priority to U.S. Provisional Patent Application No. 61/838,790, filed Jun. 24, 2013, which are hereby incorporated by reference in their entirety herein.

TECHNICAL FIELD

Disclosed herein are product dispensers having depressible thermal tips. Particularly, the thermal tips are useful for transferring heat to or from the skin.

BACKGROUND

Devices exist for dispensing cosmetic or medicinal products. Such devices usually consist of an outer tubular shell or housing, a delivery mechanism for displacement of the cosmetic or medicinal products, and an applicator tip. For example, in the medical industry, applicators are employed for applying medicinal products, such as ointments, to portions of the body. In the cosmetics and personal care industries, applicators are used to apply lipstick, lip balm, skin creams, lotions, and other cosmetic products to portions of the body.

However, conventional applicators are subject to contamination during storage or nonuse. Moreover, conventional applicators may also be prone to leakage, particularly if a cap is not used.

New and different dispensers are needed to address these and other concerns.

SUMMARY

This summary is provided to introduce simplified concepts of dispensers with depressible thermal tips, which are further described below in the Detailed Description. This summary is not intended to identify essential features of the claimed subject matter, nor is it intended for use in determining the scope of the claimed subject matter.

This disclosure is directed to dispensers having depressible thermal tips that are displaceable between open and closed positions. In the open position, the displaceable thermal tip may allow a product to be applied locally or topically to a selected area of a surface. In the closed position, the displaceable thermal tip may seal the product in the dispenser to prevent leakage and/or contamination.

In one implementation, a thermal applicator is depressibly coupled in a collar fixed to a housing. In this implementation, where a thermal applicator is depressibly coupled in a collar, the collar may include a sealing surface arranged around a perimeter of an aperture interconnected with a reservoir. When the thermal applicator is in the closed position the thermal applicator is disposed proximate to (e.g., abuts) the seal surface of the collar, and when the thermal applicator is in the open position the thermal applicator is disposed away from the seal surface of the collar to allow a product to be applied to a portion of a body.

In another implementation, a thermal applicator is depressibly coupled in a button depressibly coupled to a collar fixed to a housing. In this implementation, where a thermal applicator is depressibly coupled in a button, the button may include the sealing surface arranged around the perimeter of the aperture interconnected with a reservoir. When the thermal applicator is in the closed position the thermal applicator is disposed proximate to (e.g., abuts) the seal surface of the button, and when the thermal applicator is in the open position the thermal applicator is disposed away from the seal surface of the button to allow a product to be applied to a portion of a body.

In some implementations, a spring may be disposed below the thermal applicator biasing the thermal applicator to the closed position. Thus, a user may dispense product by pressing the thermal applicator against the skin or other surface with enough force to compress the spring and thereby depress the thermal applicator to open the dispenser. Product is then allowed to flow around an exterior of thermal applicator to exit the dispenser. In some implementations, the spring may be a coil spring. In other implementations, the spring may be an elastomer.

In some implementations, the dispensers may include a dispensing mechanism to apply a force on the product contained in a reservoir. In some implementations, the dispensing mechanism may be an airless pump. In other implementations, the dispensing mechanism may be a twist mechanism, a squeezable mechanism, a click mechanism, a slide mechanism, or any other mechanism to apply a force to expel the product contained in the reservoir.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

FIG. 1A shows a front view of an illustrative dispenser having a depressible thermal tip including a thermal applicator depressibly coupled in a collar fixed to a housing.

FIG. 1B shows a section view of an illustrative dispenser having a depressible thermal tip including a thermal applicator depressibly coupled in a collar fixed to a housing.

FIG. 1C shows a detail view of an illustrative dispenser having a depressible thermal tip including a thermal applicator depressibly coupled in a collar fixed to a housing.

FIG. 2A illustrates a front view of the depressible thermal tip illustrated in FIG. 1 having a coil spring.

FIG. 2B illustrates a section view of the depressible thermal tip illustrated in FIG. 1 having a coil spring.

FIG. 2C illustrates an exploded view of the depressible thermal tip illustrated in FIG. 1 having a coil spring.

FIG. 3A illustrates a front view of the depressible thermal tip illustrated in FIG. 1 having an elastomeric spring.

FIG. 3B illustrates a section view of the depressible thermal tip illustrated in FIG. 1 having an elastomeric spring.

FIG. 3C illustrates an exploded view of the depressible thermal tip illustrated in FIG. 1 having an elastomeric spring.

FIG. 4A shows a front view of an illustrative dispenser having a depressible thermal tip including a thermal applicator depressibly coupled in a button depressibly coupled in a collar fixed to a housing.

FIG. 4B shows a section view of an illustrative dispenser having a depressible thermal tip including a thermal applicator depressibly coupled in a button depressibly coupled in a collar fixed to a housing.

FIG. 4C shows a detail view of an illustrative dispenser having a depressible thermal tip including a thermal applicator depressibly coupled in a button depressibly coupled in a collar fixed to a housing.

FIG. 5A illustrates a front view of the depressible thermal tip illustrated in FIG. 4 having a coil spring.

FIG. 5B illustrates a section view of the depressible thermal tip illustrated in FIG. 4 having a coil spring.

FIG. 5C illustrates an exploded view of the depressible thermal tip illustrated in FIG. 4 having a coil spring.

FIG. 6A illustrates a front view of the depressible thermal tip illustrated in FIG. 4 having an elastomeric spring.

FIG. 6B illustrates a section view of the depressible thermal tip illustrated in FIG. 4 having an elastomeric spring.

FIG. 6C illustrates an exploded view of the depressible thermal tip illustrated in FIG. 4 having an elastomeric spring.

FIG. 8A illustrates a front view of a depressible thermal tip coupled to a housing having a flexible wall.

FIG. 8B illustrates a side view of a depressible thermal tip coupled to a housing having a flexible wall.

DETAILED DESCRIPTION

Figure 7:
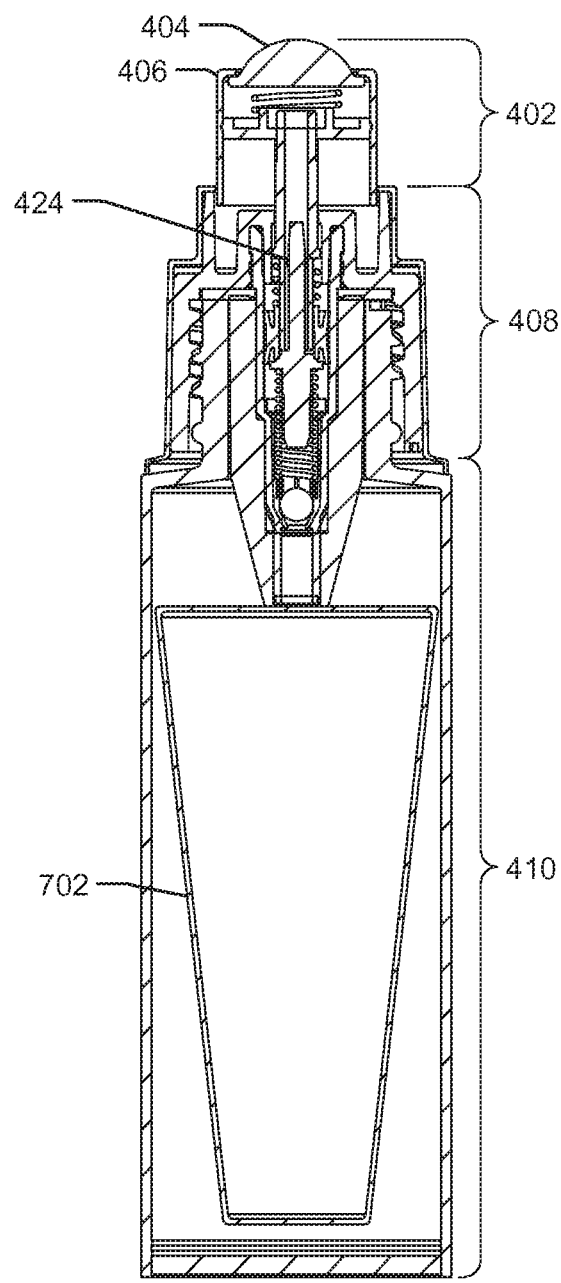
FIG. 7 illustrates the depressible thermal tip illustrated in FIG. 4 coupled to a housing having a flexible bag to hold a product to be dispensed.

This disclosure is directed to dispensers with depressible thermal tips. The depressible thermal tip applies product to a surface when displaced to an open position. In some embodiments, depressible thermal tips may include a thermal applicator depressibly coupled in a collar fixed to a housing.

In other embodiments, the depressible thermal tips may include a thermal applicator depressibly coupled in a button of a dispensing mechanism depressibly coupled in a collar fixed to a housing. For instance, a thermal applicator may be depressibly coupled to a housing having a dispensing mechanism (e.g., a click mechanism, a squeeze mechanism, a twist mechanism, an airless pump) that forces the product from a reservoir to the thermal applicator. For example, a user may depress a button to activate a push-and-click mechanism to apply a force on the product in the reservoir for application of the product to the user's skin. In another example, a user may depress a button, having the thermal applicator arranged in the button, to activate an airless pump to apply a force on the product in the reservoir for application of the product to the user's skin. The user may displace the thermal applicator depressibly coupled in a collar, or a button, from a closed position to an open position to dispense the product onto an application surface of the thermal applicator for application of the product to the user's skin. Specifically, in one example, a user may press the thermal applicator against the skin to depress the thermal applicator to open the dispenser for application of the product to the user's skin.

By virtue of the depressible thermal applicator being displaced from a closed position to an open position, a hygiene of the product contained in the reservoir may be preserved. For example, because the thermal applicator seals the product contained in the reservoir when the thermal applicator is in the closed position, the thermal applicator secures against entry of foreign bodies (e.g., water, air, debris) into the reservoir and preserves the product contained in the reservoir, and prevents leakage of the product contained in the reservoir.

FIGS. 1A-1C represent an illustrative dispenser 100 with a depressible thermal tip 102 and a housing 104. The depressible thermal tip 102 comprises a thermal applicator 106 depressibly coupled in a collar 108. The thermal applicator 106 may be a metal tip, a ceramic tip, a stone tip etc. and may change accordingly. The collar may be similar or different material or may be plastic or polymeric. In some embodiments, thermal applicator 106 may comprise a single unit of metal, stone material, ceramic, or composites thereof, whether natural or synthetic, capable of [retaining and] transferring heat or cold.

The thermal applicator 106 contacts the user's skin during or after dispensing of the product, for example, when the user causes the thermal applicator 106 to spread the product on his/her skin. By virtue of the thermal applicator's 106 thermal properties, thermal energy is transferred to or from the user's skin for heating or cooling, respectively, during application. Contact of the thermal applicator 106 with the product may also result in transfer of heat to or from the product. Accordingly, in some embodiments the user will feel a thermal sensation (warming or cooling depending on the thermal energy in the thermal applicator 106), in other embodiments the product will be warmed or cooled, and in still other embodiments both the product and user's skin will be thermally effected by the thermal applicator 106.

The thermal applicator 106 includes a material capable of retaining and/or transferring heat or cold for a period of time. In some embodiments, the thermal applicator will facilitate transfer and retention of thermal energy. Accordingly, in some embodiments, the thermal applicator 106 may be made in whole or in part of a material having a thermal conductivity above a threshold. For instance, in some embodiments, to retain and transfer sufficient heat or cold the thermal applicator 106 may be made of a material having a thermal conductivity of at least 1 Watt/meter-Kelvin. In other implementations, thermal conductivities greater than about 5.0 Watt/meter-Kelvin are desirable and, in still further implementations, thermal conductivities greater than about 20.0 Watt/meter-Kelvin are desirable.

Other material properties may also describe aspects of thermal applicators 106. For instance, heat capacity of the material may also be relevant. In some embodiments, the material from which the thermal applicator 106 is made in whole or in part may also have a heat capacity of at most about 1.1 kiloJoules/kilogram-Kelvin. In other instances, heat capacities lower than about 0.75 J/kg-K may be desirable. Moreover, thermal effusivity, which factors in a material's thermal conductivity, heat capacity, and density, may be of interest. Generally, the higher the effusivity, the greater will be the heat transfer to or from the user's skin. In some embodiments materials having a thermal effusivity higher than about 150.0 $J\text{-}m^{-2}\text{-}K^{-1}\text{-}s^{-1/2}$ may be preferred.

In some embodiments, the heat or cold retained (for subsequent transfer) by the thermal applicator 106 results from exposure to the ambient environment. That is, in some embodiments, after transfer of the heat or cold from the thermal applicator 106 to the user's skin, the thermal applicator 106 regenerates, i.e., reheats or re-cools, merely by being exposed to the ambient environment. For the purpose of this application, the term ambient environment refers to a comfortable indoor room temperature of between about 20° C. (68° F.) and about 25° C. (77° F.). In these embodiments and under the noted conditions, no additional heating or cooling may be required. In other embodiments, it may be desirable to introduce the thermal applicator 106 to a higher or lower temperature than ambient to "charge" the thermal applicator 106 with the desired heat/cold.

Some example metals that may be used in embodiments of this disclosure include steel, iron, stainless steel, aluminum, zinc, magnesium, nickel, titanium, tin, copper, brass, silver, gold, platinum, and alloys, such as ZAMAK.

Stone materials include any stone, rock, mineral, ore, gemstone, imitation gemstone, glass stone (including naturally occurring and man-made forms of glass), volcanic stone, coral stone, metallic stone or ore, magnetic stone, concrete, or composites thereof, whether synthetic or naturally occurring.

Moreover, the thermal applicator 106 may be substantially free of internal features (e.g., apertures, voids, gaps, pockets, etc.). In examples such as this in which the thermal applicator 106 comprises a single unit of material free of internal features, the thermal applicator 106 can be sandwiched in the collar 108 and create a seal with the collar 108. Moreover, because the thermal applicator 106 comprises a single unit of material free of internal features, this construction is simple and inexpensive to manufacture as it can be cast, or stamped, and need not have finishing processes such as deburring or polishing because the cut surfaces are within the collar and don't contact the user's skin. In some embodiments, the collar 108 may comprise a plastic. For example, the collar 108 may comprise a polypropylene (PP), an Acrylonitrile butadiene styrene (ABS), or other plastic materials. In some embodiments, a cap may removeably cover the thermal applicator 106 and/or the collar 108.

FIG. 1B illustrates a section view of the dispenser 100 taken along line A-A of FIG. 1A. The section view shows the thermal applicator 106 depressibly coupled in the collar 108 fixed distal to a first end 112(A) opposite a second end 112(B) of the housing 104. The housing 104 includes a reservoir 114 for storing a product (e.g., a cream, a liquid, a powder, and the like).

The section view of FIG. 1B illustrates a dispensing mechanism 116 arranged with the housing 104 to apply a force in the direction of arrow 118 on the product contained in the reservoir 114. In this example, the dispensing mechanism 116 comprises a click mechanism to apply the force 118 on the product in the reservoir 114. For example, and as FIG. 1B illustrates, the click mechanism may apply a force 118 on the reservoir 114 contained in the housing 104. Moreover, the dispensing mechanism 116 may be selectively actuated by a user via an actuator 120. While FIG. 1B illustrates the actuator 120 comprising a push-and-click button disposed on the second end 112(B) of the housing 104, the actuator 120 may comprise a push-and-click button disposed on a side of the housing 104, a slide button disposed on a side of the housing 104, a twist knob disposed on the second end 112(B) of the housing 104, a twist knob disposed on a side of the housing 104, or the like, to selectively actuate the dispensing mechanism 116. Moreover, actuator 120 and dispensing mechanism 116 may cooperate to dispense a fixed measure of product. For example, each push-and-click of the actuator 120, the dispensing mechanism 116 may apply a force 118 on the reservoir 114 to displace a predetermined, measured amount of product out of the reservoir 114.

The detail view of FIG. 1C illustrates the collar 108 fixed to the first end 112(A) of the housing 104. The collar 108 has a seal surface 124 arranged around a perimeter of an aperture 126. While FIG. 1C illustrates the seal surface 124 being void of a gasket or O-ring, in other embodiments the seal surface 124 may include a gasket and/or an O-ring. For example, the seal surface 124 may include an O-ring groove to hold an O-ring to seal with the thermal applicator 106. The aperture 126 of the collar 108 is fluidly interconnected with the reservoir 114 containing the product. For example, a series of interconnections and/or ducting may be arranged from the reservoir 114 to the aperture 126 to displace the product from the reservoir 114 out of the aperture 126.

FIG. 1C illustrates the thermal applicator 106 disposed in a closed position 128 and arranged to be linearly displaced from the closed position 128 to an open position 130. FIG. 1C illustrates a dashed lined thermal applicator 106 in the open position 130. When the thermal applicator 106 is in the closed position 128, the thermal applicator 106 is disposed proximate to or abuts the seal surface 124 of the collar 108 and closes the aperture 126 and seals the reservoir 114. When the thermal applicator 106 is in the open position 130, the thermal applicator 106 is disposed away from the seal surface 124 of the collar 108. When the thermal applicator 106 is disposed away from the seal surface 124, the thermal applicator 106 opens the aperture 126 and provides for dispensing the product from the reservoir 114 to the thermal applicator 106 to apply the product to a portion of the body.

FIG. 1C illustrates an inner collar 132 fixed distal to the housing 104 inside the collar 108. The inner collar 132 may prevent the thermal applicator 106 from being displaced too far down in the collar 108 towards the housing 104. For example, a first end of the inner collar 132 may be fixed to a neck # of the housing 104, and a second end # of the inner collar 132 may be arranged to abut with a bottom surface 134 of the thermal applicator 106. For example, when the thermal applicator 106 is in the open position 130, the bottom surface 134 of the thermal applicator 106 may abut or interface with the first end # of the inner collar 132. Moreover, the collar 132 may include one or more apertures or ports arranged in the first end # of the inner collar 132 to allow product to pass from inside the inner collar 132 to a void # inside the collar 108 when the thermal applicator 106 is in the open position 130. For example, the inner collar 132 may include one or more apertures to allow product to pass from inside the inner collar 132 to a void # inside the collar 108 when the bottom surface 134 of thermal applicator 106 is abutting the first end of the inner collar 132. The thermal applicator 106 may include a key or keyway (not shown) to engage a complimentary feature in the collar 108 to guide its movement linearly and/or prevent rotation of the thermal applicator 106 within the collar 108.

The inner collar 132 may be a separate part fixed to the housing 104 via an adhesive, a weld (e.g., an ultrasonic weld), a press fit, a snap fit, a screw thread, or other attachment mechanisms. The inner collar 132 may be a separate part fixed to the housing 104 after the reservoir 114 receives a product. Moreover, the inner collar 132 may be formed integral with the housing 104 before the reservoir 114 receives a product. Although FIG. 1C illustrates the collar 108 being fixed to the housing via a snap fit, the collar 108 may be fixed to the housing 104 via an adhesive, a weld (e.g., an ultrasonic weld), a press fit, a screw thread, etc. The collar 108, inner collar 132, and thermal applicator 106 may be preassembled together prior to attachment of the whole depressible thermal tip 102 to the housing 104.

FIGS. 2A-2C illustrate the depressible thermal tip 102 illustrated in FIG. 1 having a coil spring 202. FIG. 2B illustrates a section view 204 taken along line B-B. The section view of FIG. 2B shows the coil spring 202 disposed below the thermal applicator 106 biasing the thermal applicator 106 to the closed position 128. FIG. 2C illustrates an exploded view of the thermal depressible thermal tip 102 having the coil spring 202. The exploded view 206 shows the collar 108 having a first end 208 opposite a second end 210, and the aperture 126 arranged in the first end 208. The exploded view 206 shows the inner collar 132 having a portion 212 extending distal to an end 214 of the inner collar 132. The coil spring 202 may be arranged around at least the portion 212 of the inner collar 132. The end 214 of the inner collar 132 may support the coil spring 202. Moreover, the coil spring 202 may be arranged between the bottom surface 134 of the thermal applicator 106 and the end 214 of the inner collar 132. The coil spring 202 may be formed of metal, plastic, composite, or any other material suitable for biasing the thermal applicator 106 towards the closed position 128.

FIGS. 2A-2C illustrate the thermal applicator 106 having a curvilinear shape 216. For example, as seen best in FIG. 2C, a substantially convex dome shaped top surface # extends distal to a planar surface of the bottom surface 134 of the thermal applicator 106. While FIGS. 2A-2C illustrate the curvilinear shape 216 comprising a substantially dome shaped top surface extending distal to a planar bottom surface, the curvilinear shape 216 may be multiple domes extending distal to a planar bottom surface, a nub extending distal to a planar bottom surface, multiple nubs extending distal to a planar bottom surface, multiple domes and nubs extending distal to a planar bottom surface, a sphere (e.g., a roller ball), multiple spheres extending distal to a planar bottom surface, etc. In fact, the thermal applicator may take any shape and is not limited to dome or other geometrical shapes.

The aperture 126 may include a guide or structure 218 to guide the thermal applicator 106 inside the aperture 126 of the collar 108. For example, the aperture 126 may include a planar surface extending axial into the collar 108 that slideably receives the thermal applicator 106.

FIGS. 3A-3C illustrate the depressible thermal tip 102 illustrated in FIGS. 1A-1C having an elastomeric member 302. FIG. 3B illustrates a section view taken along line C-C. The section view of FIG. 3B shows the elastomeric member 302 is disposed below the thermal applicator 106 biasing the thermal applicator 106 to the closed position 128. FIG. 3 illustrates an exploded view 306 of the thermal depressible thermal tip 102 having the elastomeric member 302. The exploded view of FIG. 3C shows the elastomeric member 302 may (but need not necessarily) be a single unit of material arranged to be fixed distal to the inner collar 132. For example, the elastomeric member 302 may be a single unit of material fixed distal to the end 214 of the inner collar 132 via over-molding or an adhesive. The elastomeric member 302 may be formed of an elastomer suitable for biasing the thermal applicator 106 towards the closed position 128. Moreover, the elastomeric member 302 may be formed of an elastomer capable of being molded to the inner collar 132. The inner collar 132 in this example may be formed of polypropylene (PP) or acrylonitrile butadiene styrene (ABS) and is capable of maintaining its shape during an injection over-molding manufacturing process. Specifically, the inner collar 132 is capable of maintaining its shape when the elastomeric member 302 is injection over-molded to the inner collar 132.

FIGS. 4A-4C represent an illustrative dispenser 400 having a depressible thermal tip 402 including a thermal applicator 404 depressibly coupled in a button 406 of a dispensing mechanism and the button 406 depressibly coupled in a collar 408 fixed to a housing 410. In this embodiment where the thermal applicator 404 is depressibly coupled in the button 406, and the button 406 is depressibly coupled in the collar 408 fixed to the housing 410, the depressible thermal tip 402 may be an actuator of the dispensing mechanism (e.g., an airless pump) for dispensing the product from the dispenser 400. Moreover, because the depressible thermal tip 402 is the actuator for dispensing the product from the dispenser 400, a user may depress the depressible thermal tip 402 and dispense the product around the exterior of the thermal applicator 404 and onto a portion of the user's body. While FIGS. 4A-4C illustrate the thermal applicator 404 having a substantially planar bottom surface, the thermal applicator 404 is not limited to a planar bottom surface. For example, the thermal applicator 404 may have a substantially spherical member (e.g., a roller ball) and may rotate in the button 406.

For example, the thermal applicator 404 may comprise a roller ball that displaces axially 438 to the open position 130 and rotates as a user presses the button 406 against the skin to depress the thermal applicator to open the dispenser for application of the product to the user's skin. FIGS. 4A-4C illustrate a section view 412 of the dispenser 400 taken along line D-D. The section view 412 shows a bottom portion 414(A), opposite a top portion 414(B), of the collar 408 fixed to a first end 416(A), opposite a second end 416(B), of the housing 410. A channel 418 may be arranged in the top portion 414(B) of the collar 408 to slideably receive a bottom portion 420(A), opposite a top portion 420(B), of the button 406.

The section view of FIG. 4B illustrates that the housing 410 may include a reservoir 422, and the collar 408 may include a dispensing mechanism 424. The dispensing mechanism 424 arranged with the collar 408 is arranged to apply a force 426 on the product contained in the reservoir 422. For example, and as FIGS. 4A-4C illustrate, the dispensing mechanism 424 arranged in the collar 408 may comprise an airless pump interconnected with the reservoir 422 and arranged to apply a vacuum on the reservoir to apply a force 426 on the product to expel the product from the reservoir.

The detail view of FIG. 4C illustrates a plunger 430 having a first end 432(A) opposite a second end 432(B). The first end 432(A) of the plunger 430 fixed inside the button 406 between the top and bottom portions 420(A) and 420(B) of the button 406. The second end 432(B) of the plunger 430 fixed to the dispensing mechanism 424. The thermal applicator 404 has an application surface 434 opposite a contacting surface 436. The application surface 434 of the thermal applicator 404 is exposed in the top portion 420(B) of the button 406. The contacting surface 436 of the thermal applicator 404 is arranged above the first end 432(A) of the plunger 430 to abut with the first end 432(A) of the plunger 430. While this detail view illustrates the contacting surface 436 comprising a substantially planar surface, the contacting surface 436 have any shaped surface. For example, the contacting surface 436 may have a substantially curvilinear shaped surface (e.g., a nub shaped surface, a dome shaped surface, a cylindrical shaped surface, etc.) to abut with the first end 432(A) of the plunger 430.

When the button 406 is displaced in towards the housing 410, the plunger 430 actuates the dispensing mechanism 424. For example, when a user presses the top portion 420(B) of the button 406 against a portion of a body, the button 406 is linearly displaced in toward the housing 410, into the channel 418 arranged in the top portion 414(B) of the collar 408, actuating the dispensing mechanism 424. As the dispensing mechanism 424 is actuated, the product contained in the reservoir 422 is dispensed axially 438, relative to the button 406, onto the application surface 434 of the thermal applicator 404 exposed in the top portion 420(B) of the button 406 to apply the product to a portion of the body. While the depressible thermal tip 402 is illustrated to be arranged substantially in-line (e.g., rectilinearly) with the housing 410, the depressible thermal tip 402 may be arranged at any angle relative to the housing 410. For example, the depressible thermal tip 402 may be arranged at a substantially 90 degree angle relative to the housing 410. For example, the depressible thermal tip 402 may be arranged at a 90 degree angle relative to the housing to provide for applying product to a portion of the body more easily than applying product to the portion of the body using a depressible thermal tip 402 arranged in-line with the housing 410.

FIGS. 4A-4C illustrate an example in which the thermal applicator 404 is displaceably coupled in the button 406. For example, when the button 406 is displaced in towards the housing 410, the thermal applicator 404 is displaced axially 438, relative to the button 406, towards the housing 410. For example, a user may apply a force on the application surface 434 of the thermal applicator 404 and displace the thermal applicator 404 axially 438, from the closed position 128 to the open position 130. When the thermal applicator 404 is in the open position 130, the contacting surface 436 of the thermal applicator 404 may abut or interface with the first end 432(A) of the plunger 430. Moreover, the first end 432(A) of the plunger 430 may include one or more apertures or ports arranged in the first end 432(A) of the plunger 430 to allow product to pass from behind the first end 432(A) of the plunger 430 to a void inside the button 406 when the thermal applicator 404 is in the open position 130. When the thermal applicator 404 is in the closed position 128, the thermal applicator 404 seals the void inside the button 406 and secures against entry of foreign bodies (e.g., water, air, debris) into the void inside the button 406 and/or the reservoir 422 and preserves the product contained in the void inside the button 406 and/or the reservoir 422.

When the user continues to apply a force on the thermal applicator 404 and the button 406, both the thermal applicator 404 and the button 406 are axially 438 displaced in towards the housing 410 together. That is, subsequent to the thermal applicator 404 being displaced to the open position 130, both the thermal applicator 404 and the button 406 are simultaneously displaced axially 438, down toward the housing 410. As both the thermal applicator 404 and the button 406 are simultaneously displaced axially 438, down toward the housing 410, the plunger 430 actuates the dispensing mechanism 424. As the dispensing mechanism 424 is actuated, the product contained in the reservoir 422 is dispensed axially 438, around an exterior of the thermal applicator 404 in the open position 130, and onto the application surface 434 of the thermal applicator 404 exposed in the top portion 420(B) of the button 406 to apply the product to a portion of the body. In the airless pump example, the applied vacuum reduces a volume of the reservoir 422 displacing the product to the application surface 434. As section view 412 illustrates, the reservoir 422 may include an internal cap 440 arranged to be slideably displaced up towards the first end 416(A) of the housing 410 to reduce a volume of the reservoir 422, when the airless pump applies a vacuum on the reservoir 422. Moreover, the housing 410 may comprise a substantially rigid tube, and the internal cap 440 displaceably coupled in the substantially rigid tube may define the reservoir 422 for containing the product. When the button 406 is displaced in towards the substantially rigid tube, the internal cap 440 is displaced up towards the first end 416(A) of the substantially rigid tube, reducing a volume of the reservoir.

FIGS. 5A-5C illustrate the depressible thermal tip 402 illustrated in FIGS. 4A-4C having a coil spring 502. FIG. 5B illustrates a section view 504 taken along line E-E. The section view of FIG. 5B shows the coil spring 502 disposed below the thermal applicator 404, biasing the thermal applicator 404 to the closed position 128. FIG. 5C illustrates an exploded view of the thermal depressible thermal tip 402 having the coil spring 502. The exploded view shows the button 406 having the first end 420(A) opposite the second end 420(B), and the aperture 126 arranged in the second end 420(B). The exploded view shows the plunger having a portion 508 extending distal to the first end 432(A) of the plunger 430. The coil spring 502 may be arranged around at least the portion 508 of the plunger 430. Moreover, the coil spring 502 may be arranged between the contacting surface 436 of the thermal applicator 404 and the first end 432(A) of the plunger 430. The coil spring 502 may be formed of metal, plastic, composite, or any other material suitable for biasing the thermal applicator 404 towards the closed position 128.

FIGS. 5A-5C illustrate the thermal applicator 404 having the curvilinear shape 216 discussed above with regard to FIGS. 2A-2C. For example, FIGS. 5A-5C illustrate a substantially domed shaped application surface 434 extending distal to a planar contacting surface 436 of the thermal applicator 404. Although FIGS. 5A-5C illustrate the curvilinear shape 216 comprising a substantially domed shaped application surface 434 extending distal to a planar contacting surface 436, in other embodiments the curvilinear shape 216 may include multiple domes extending distal to a planar contacting surface, a nub extending distal to a planar contacting surface, multiple nubs extending distal to a planar contacting surface, multiple domes and nubs extending distal to a planar contacting surface, or any other suitable shape.

The section view 504 shows the first end 432(A) of the plunger 430 fixed inside the button 406 between the top and bottom portions 420(A) and 420(B) of the button 406, via a snap fit 510. While the section view of FIG. 5B shows the first end 432(A) of the plunger 430 fixed inside the button 406 via a snap fit 510, the first end 432(A) of the plunger 430 may be fixed inside the button 406 via an adhesive, a weld (e.g., an ultrasonic weld), a press fit, screw thread, or other attachment mechanisms. The first end 432(A) of the plunger 430 may support the coil spring 502.

FIGS. 6A-6C illustrate the depressible thermal tip 402 illustrated in FIG. 4 having an elastomeric spring 602. FIG. 6B illustrates a section view taken along line F-F. The section view shows the elastomeric spring 602 is disposed below the thermal applicator 106 biasing the thermal applicator 404 to the closed position 128. FIG. 6C illustrates an exploded view of the thermal depressible thermal tip 402 having the elastomeric spring 602. The exploded view shows the elastomeric spring 602 may be a single unit of material arranged to be fixed distal to the plunger 430. For example, the elastomeric spring 602 may be a single unit of material fixed distal to the first end 432(A) of the plunger 430 via over-molding or an adhesive. As discussed above with regard to FIG. 3, the elastomeric member 602 may be formed of an elastomer suitable for biasing the thermal applicator 404 towards the closed position 128, and capable of being molded to the plunger 430.

FIG. 7 illustrates the depressible thermal tip illustrated in FIGS. 4A-4C coupled to the housing 410 having a flexible bag 702. The flexible bag 702 may be arranged inside the housing 410 and define a reservoir for contain a product. When the button 406 is displaced in towards the housing 410, the dispensing mechanism 424 produces a vacuum in the flexible bag 702, collapsing the flexible bag 702, and reducing a volume of the reservoir.

FIGS. 8A and 8B illustrate a dispenser 800 having depressible thermal tip 802 coupled to a housing 804 having a flexible wall 806. While FIG. 8 illustrates the depressible thermal tip 802 comprising a thermal tip depressibly coupled in a collar, as discussed above with regard to FIG. 1, the depressible thermal tip 802 may comprise a thermal tip depressibly coupled in a button, as discussed above with regard to FIG. 4.

The flexible wall 806 may form a portion of a reservoir for containing a product. For example, the flexible wall 806 may form a portion of a flexible bottle (e.g., a tottle). The flexible wall 806 may provide for displacing a product from the reservoir of the dispenser 800. For example, a user may displace the flexible wall 806 to apply a force on the product contained in the reservoir to displace the product to the depressible thermal tip 802.

The dispenser 800 may not include an airless pump, a twist mechanism, a click mechanism, or the like to apply a force on the product in the reservoir. This is because a user may displace the flexible wall 806 to apply a force on the product contained in the reservoir. The flexible wall 806 may be formed of terpolymer or any other suitable material that allows the flexible wall 806 to be displaced as well as be non-reactive or resistant to the product being dispensed.

Figure 9A:
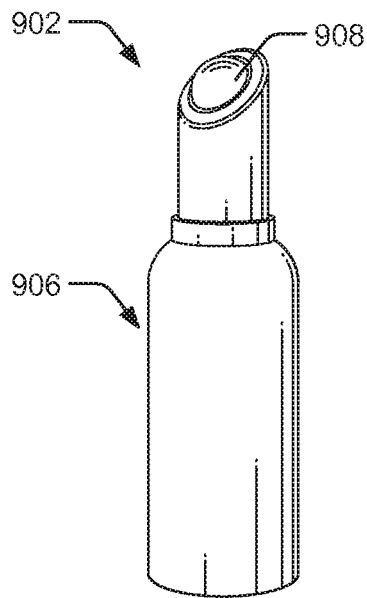
FIGS. 9A and 9B show alternative shaped depressible thermal tips.
Figure 9B:
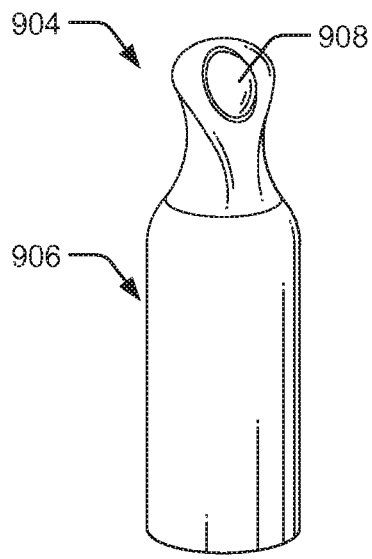

FIGS. 9A and 9B show alternative shaped depressible thermal tips 902 and 904, coupled to generally cylindrical housings 906. While FIGS. 9A and 9B illustrate the depressible thermal tips 902 and 904 comprising a thermal applicator 908 depressibly coupled in a collar 910, as discussed above with regard to FIG. 1, in other embodiments the depressible thermal tips 902 and 904 may alternatively comprise a thermal applicator depressibly coupled in a button, as discussed above with regard to FIG. 4. As illustrated in FIG. 9A, the depressible thermal tip 902 is generally a cylindrical collar 910 having an oblique application surface 912 with a thermal applicator 908 disposed therein. As illustrated in FIG. 9B, the depressible thermal tip 904 comprises a curved bill-shape collar 914 having a curved application surface 916 with a thermal applicator 908 disposed therein. However, in other implementations, the depressible thermal tips 902 may take any other desired forms, such as generally curvilinear shape, a generally cylindrical shape, a generally conical shape, a generally planar shape, a finger shape, combinations of the foregoing, or the like.

Although various embodiments have been described in language specific to structural features and/or methodological acts, it is to be understood that the claims are not necessarily limited to the specific features or acts described. Rather, the specific features and acts are disclosed as illustrative forms of implementing the embodiments.

What is claimed is:

1. A cosmetic dispenser for applying a product to a body comprising:
   a housing having a reservoir for storing the product, the housing having flexible walls;
   a collar coupled to the housing;
   a button displaceable within the collar; and
   a thermal applicator displaceable within the button;
   wherein when the flexible walls of the housing are depressed, the button is moved within the collar, and the thermal applicator is moved within the button, and product flows around an exterior of the thermal applicator.

2. The cosmetic dispenser of claim 1, wherein the thermal applicator comprises metal, stone material, or ceramic.

3. The cosmetic dispenser of claim 1, wherein the thermal applicator includes a domed application surface that extends beyond the button in a direction away from the housing.

4. The cosmetic dispenser of claim 3, wherein the thermal application is a rotatable ball.

5. The cosmetic dispenser of claim 1, wherein the button is axially displaceable within the collar.

6. The cosmetic dispenser of claim 1, wherein the thermal applicator is axially displaceable within the button.

7. The cosmetic dispenser of claim 1, wherein the button and thermal applicator are displaceable simultaneously.

8. The cosmetic dispenser of claim 1, wherein the button and thermal applicator are displaceable individually.

9. The cosmetic dispenser of claim 1, wherein the button includes an interior void configured to receive product from the reservoir when the button is displaced within the collar.

10. The cosmetic dispenser of claim 9, wherein when the thermal applicator is displaced within the button, product is released around the thermal applicator, wherein when the thermal applicator is released, the thermal applicator seals the void.

11. A cosmetic dispenser for applying a product to a body comprising:
    a housing having a closed end opposite an open end, and a reservoir for containing the product, the housing having flexible walls; and
    a thermal applicator depressibly coupled in the open end of the housing, the thermal applicator being depressible from a closed position preventing the product from being dispensed to an open position allowing the product to be dispensed, the thermal applicator including:
        a button, the button having a top portion opposite a bottom portion, the bottom portion of the button displaceably coupled to the open end of the housing; and
        an application surface exposed within the top portion of the button for applying the product to a portion of the body, wherein the button surrounds the application surface;
    wherein when the button is displaced towards the housing and the flexible walls are depressed, the product is dispensed axially, relative to the button, onto the application surface exposed in the top portion of the button.

12. The cosmetic dispenser of claim 11, wherein the cosmetic dispenser further comprises a collar fixed to the open end of the housing, the collar having a channel configured to slidably receive the bottom portion of the button.

13. The cosmetic dispenser of claim 11, wherein the application surface is biased in the closed position in which a portion of the application surface abuts the top portion of the button, the application surface axially displaceable relative to the top portion of the button to the open position in which the portion of application surface is spaced apart from the top portion of the button, allowing product to flow around an exterior of the application surface to dispense the product.

14. The cosmetic dispenser of claim 13, wherein the application surface is a roller ball configured to rotate as it is displaced axially relative to the button.

15. The cosmetic dispenser of claim 13, wherein the application surface has a planar bottom surface and a domed top surface.

16. The cosmetic dispenser of claim 11, wherein the button is fixed against rotation about at least one axis.

17. The cosmetic dispenser of claim 11, wherein the application surface comprises metal, stone material, or ceramic.

18. The cosmetic dispenser of claim 11, wherein the thermal applicator is arranged at a 90 degree angle relative to a longitudinal axis of the housing.

19. The cosmetic dispenser of claim 11, wherein the button and applicator surface are configured to be displaced axially independent of one another.

20. A dispenser for applying a product to a body, the dispenser comprising:
  a housing having flexible walls;
  a collar fixed to an open end of the housing;
  a button having a first end including a seal surface and a second end depressibly coupled to the collar; and
  an applicator depressibly coupled within the button, the applicator being depressible from a closed position to an open position, wherein when the applicator is in the closed position the applicator abuts the seal surface of the button, and when the applicator is in the open position the applicator is spaced from the seal surface of the button.

* * * * *